INVENTORS
LOUIS WILSON
ARTHUR F. HOGREFE

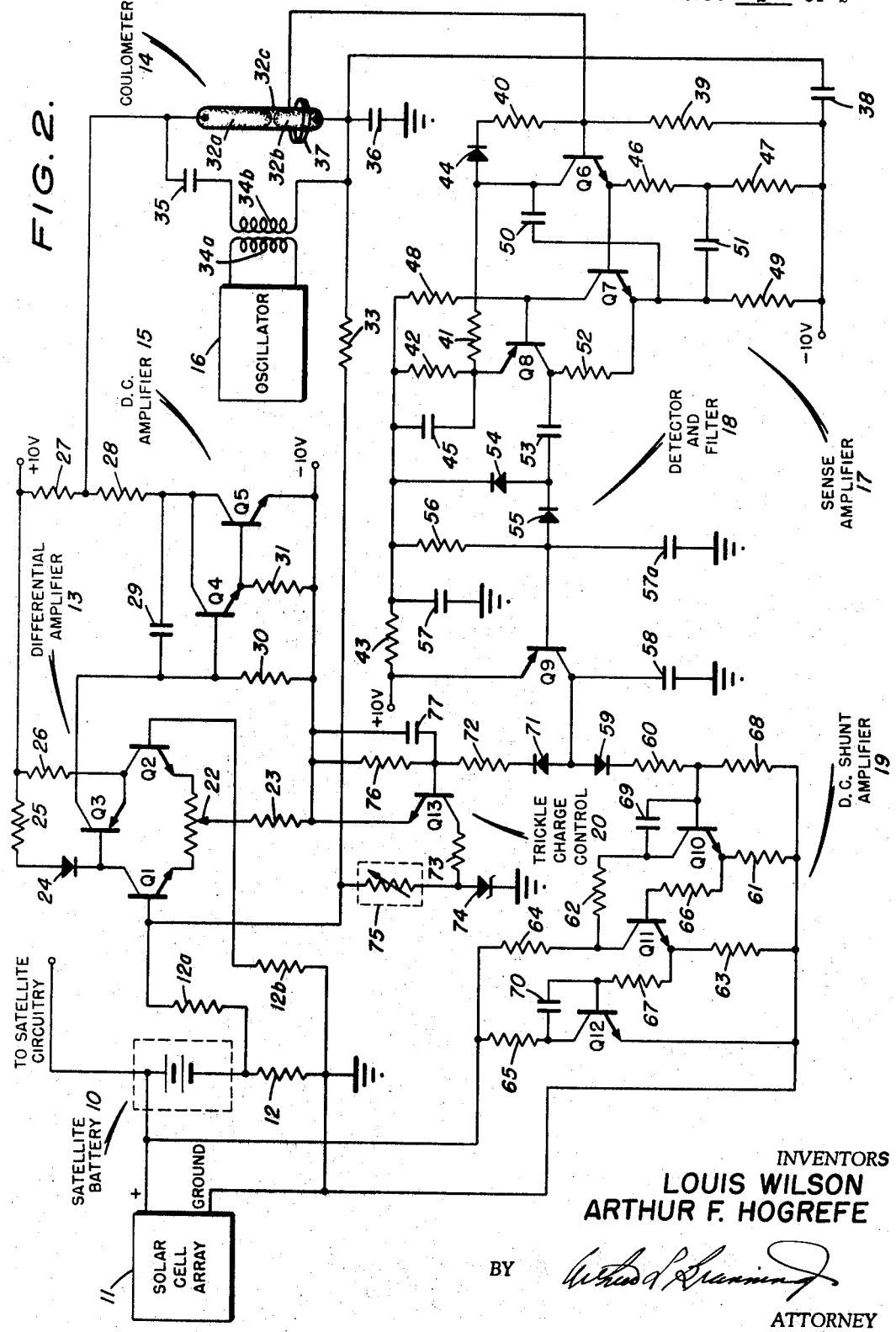

United States Patent Office 3,421,067
Patented Jan. 7, 1969

3,421,067
BATTERY CHARGE CONTROLLER UTILIZING
COULOMETER
Louis Wilson and Arthur F. Hogrefe, Silver Spring, Md., assignors to the United States of America as represented by the Secretary of the Navy
Filed June 24, 1966, Ser. No. 560,958
U.S. Cl. 320—14    8 Claims
Int. Cl. H02j 7/00; H01m 45/04

ABSTRACT OF THE DISCLOSURE

The present invention relates to improved battery charge control circuitry, including a coulometer, which provides closed loop control of the charging of the battery solely on an ampere hour basis. The proposed circuitry includes a current regulating feedback loop which insures that the coulometer is always energized at a fixed fraction of the battery current, both charge and discharge, so that the coulometer accurately measures the state of charge of the battery. The coulometer measurement is then used to cause the battery to be charged at a maximum available current rate until a charge exactly equal to a previous discharge has been accomplished. Additionally, the coulometer detects when the battery has been returned to its fully charged condition and then automatically reduces the charging current to a predetermined trickle value.

---

Figure 1:
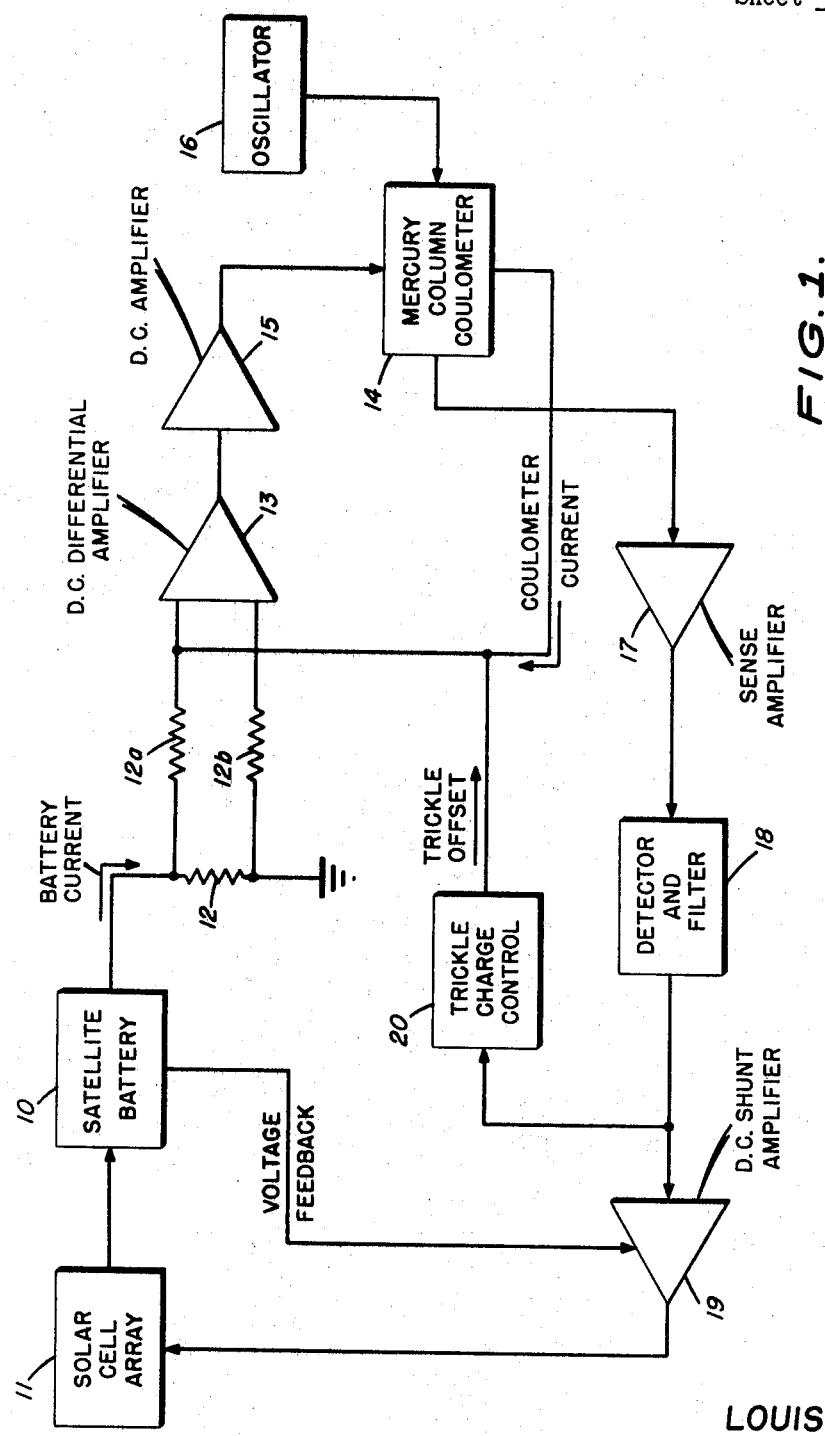

The present invention generally relates to battery charge controllers and more particularly, it relates to improved battery control circuitry, including a coulometer, for accurately controlling the charging and discharging of a battery so as to increase the useful life thereof.

Although the present invention could be used in many practical applications where it is desirable to accurately control the charging and discharging of a battery, it is particularly adapted for use with a satellite-borne battery which is supplied with charging energy from a solar cell array, for example, so as to improve the useful life of the battery, and therefore also the operating life of the satellite, by insuring that the satellite battery does not become excessively discharged and/or excessively over-charged. It is well-known, for example, that if excessive over-charging occurs, the internal battery pressure may likely build-up to such an extent that the battery will rupture and become inoperative. More specifically, the system of the present invention can be employed with all alkaline sealed satellite cells including the nickel-cadmium, silver-zinc and silver-cadmium types, etc.

Many unsucessful attempts have been made heretofore to provide an accurate battery charge control system for satellites. For example, some such previously proposed systems rely upon the value of battery voltage to indicate the state of battery charge. However, it has been found that battery voltage is not a particularly good state of charge indicator for the type of batteries commonly used aboard satellites. For example, the charging or discharging of a commonly used nickel-cadmium battery to about 95% of its capacity produces voltage variations which are dependent on many factors such as temperature, pressure, battery history and state of charge. Hence, it follows that voltage sensing to determine the state of battery charge is rather inefficient and qualitative.

In view of the above-remarks, it is generally proposed in accordance with the present invention to accomplish the required accurate charge control of such a satellite battery, by employing a coulometer, i.e., a well-known device for integrating an applied electrical current, which is supplied with a current proportional to the existing charging or discharging current of the battery. The coulometer then integrates the applied current with respect to time and thereby provides a very accurate measurement of the charge level of the battery.

In the illustrated embodiment of the present invention, to be described in more detail hereinafter, a mercury column coulometer is preferably used and comprises a pair of mercury electrodes separated by a conductive electrolytic bubble whose position in the column represents an accurate time integration of the current applied to the coulometer.

In accordance with the present invention, it is further proposed to employ two feedback loops: the first of which functions as a regulator for causing the current applied to the coulometer to be in direct proportion to the existing battery current; and, the second of which functions as a servo and utilizes the coulometer as its integrator for controlling the amount of charging energy supplied by the solar cell array to the battery, in such a manner that the battery is always maintained substantially in its fully charged condition. More specifically, when the coulometer indicates that the battery has been discharged from its fully charged condition, this second or servo feedback loop allows the battery to be charged at a maximum current available rate until a charge equal to the previous discharge is accomplished, at which time the charging current will automatically be reduced to a lower trickle value that is known to be safe for continuous operation; i.e., without causing the battery to generate dangerously excessive voltages. Replenishing the battery charge at high current rates is not harmful since the ampere-hour conversion of this type of battery is less than 100% efficient. According to this invention, the input charge to the battery is moreover reduced to a safe trickle level before it reaches full charge. In other words, the system of the present invention insures that the battery will operate under safe conditions for every portion of its orbit in flight so that the battery is not subjected to any appreciable stress and its operational life is thereby extended.

In view of the above discussion, a general object of the present invention is to provide an improved battery charge controller.

Another object of the present invention is to provide battery charge control circuitry incorporating a coulometer to integrate the battery current so as to provide an accurate indication of the state or level of battery charge.

Another object of the present invention is to provide an automatic battery charge controller which permits charging of the battery, after discharge, at a maximum current available rate, until a charge equal to a previous discharge is accomplished and at which time the charging current is automatically reduced to a value which may be safely and continuously applied to the battery in order to maintain it in a fully charged state.

Another object of the present invention is to provide battery charge control circuitry wherein a mercury column coulometer is employed in a feedback control loop effective to maintain a battery in its fully charged condition.

Another object of the present invention is to provide an automatic battery charge controller for satellites, wherein the existing battery current, both charge and discharge, is monitored by a mercury coulometer which integrates the existing battery current and provides an indication which is subsequently used in a control feedback loop to adjust the amount of charging current supplied to the battery from a suitable source of charging energy, such as a solar cell array.

Another object of the present invention is to provide a battery charge controller wherein a predetermined trickle current whose value will be automatically and continuously set by the battery temperature is applied to the battery, once it is detected as being in its fully charged condition by the system, effective to maintain the battery in such fully charged condition without over-charging.

Another object of the present invention is to provide a battery charge control system wherein changes in coulometer resistance, due to changes in temperature, will not affect the magnitude of the current input into the coulometer since such current input is derived from a high impedance feedback loop circuit.

Other objects, purposes and characteristic features of the present invention will in part be pointed out as the description of the invention progresses, and in part be obvious from the accompanying drawings, wherein:

FIG. 1 is a block diagram illustrating one embodiment of the present invention as adapted for controlling the charging and discharging of a satellite-borne battery; and FIG. 2 is a detailed circuit diagram of the battery charge controller shown in FIG. 1.

Referring now to the block diagram of FIG. 1, one side of a satellite-borne battery 10 is connected to receive input charging energy from a conventional solar cell array 11; whereas, the other side of the battery 10 is connected to ground by a suitable small value monitoring resistance 12 across which is developed a voltage signal proportional to or the analog of existing battery current. This resistance might, for example, have a value of 0.1 ohm.

The existing battery current monitored by the resistance 12 is then applied via resistor 12a, as one input to a suitable D.C. differential amplifier 13. The second input to the differential amplifier 13, as monitored at resistance 12a, is a current value designated as COULOMETER CURRENT in FIG. 1 and which is supplied via a feedback loop including mercury column coulometer 14 and D.C. amplifier 15. The differential amplifier 13 then operates in a manner, to be described in more detail hereinafter, and controls or regulates the current through the mercury coulometer 14 to be a predetermined proportion of the existing battery current. Specifically, the ratio of battery current to coulometer current is predetermined by the value of resistor 12a relative to resistor 12. In practice, for example, the resistance 12a might have a value of 237 ohms; whereby the coulometer is controlled to be energized with a current value equal (0.1/237) times battery current. A resistor 12b which is equal in value to resistor 12a connects the other side of the differential amplifier 13 to the ground side of resistor 12.

The mercury column coulometer 14 is a well-known device comprising a pair of mercury electrodes separated by a conductive electrolytic bubble whose position in the column represents a time integration of the current applied thereto. Consequently, since the coulometer current is maintained in direct proportion to the existing battery current, whether charge or discharge, the mercury coulometer 14 provides an accurate indication of the state or level of battery charge.

As will be described in further detail hereinafter, the indication of battery charge level provided by the coulometer 14 is read out electronically by energizing the coulometer 14 from a suitable source of high frequency current, such as the oscillator 16, to generate a small, high frequency output voltage signal whose magnitude is dependent upon the position of the electrolytic bubble and which is then applied to a sense amplifier 17, where this voltage signal is amplified for further application to a suitable detector and filter circuit 18. It has been found in practice that an oscillator frequency of 100 kc. is suitable.

The output of the detector and filter 18 is a D.C. voltage level which is applied, on one hand, to a D.C. shunt amplifier circuit 19, for controlling the amount of input charging energy that the solar cell array 11 can apply to the satellite battery 10 in accordance with the charge level of the battery as indicated by mercury coulometer 14. Simultaneously, the output of the detector and filter network 18 is also applied to a trickle charge control circuit 20 which is effective to cause a predetermined trickle offset current value to be applied as a third input to the D.C. differential amplifier 13, for the purpose of offsetting this differential amplifier 13 slightly so that a predetermined small amount of input charging energy will be applied to the battery 10 even though the battery 10 is in its fully charged condition. For reasons previously set forth, the specific value of this trickle offset current is preferably made variable as a function of ambient temperature.

Referring now to the detailed circuit diagram of FIG. 2, the satellite battery 10 and the current monitoring resistor 12 are connected in series across the output of the solar cell array 11. The existing battery current thus generates a corresponding analog voltage signal across resistor 12 which is applied, through resistor 12a, to the base of an npn transistor Q1.

The transistor Q1, together with npn transistor Q2, forms the D.C. differential amplifier 13 shown in FIG. 1. The base of transistor Q2 is connected to the other side of the monitor resistor 12 through a resistance 12b having an equal value with resistor 12a, so that both sides of the differential amplifier 13 are fed from equal impedances. The emitters of the transistors Q1 and Q2 are tied together by a balancing potentiometer 22 whose purpose is to match the transistor pair for accurate differential amplifier operation. The center tap of the potentiometer 22 is connected, via resistor 23, to a suitable source of negative supply voltage which is illustrated as being −10 volts. The collector of the transistor Q1 is connected to a suitable source of positive supply voltage (shown as +10 volts) by diode 24 and resistor 25; whereas, the collector of transistor Q2 is connected to this same positive supply voltage by an equal value resistor 26.

The collectors of transistors Q1 and Q2 are moreover connected respectively to the base and emitter of a pnp transistor Q3 which serves as an output steering transistor to eliminate common mode problems in the differential amplifier circuit 13 and also, together with the diode 24, insures that transistors Q1 and Q2 operate at substantially the same collector current. The output of the transistor Q3, appearing as its collector current, is a function of the relative transconductance of the transistors Q1 and Q2 contained in the differential amplifier 13, and since the bases of transistors Q1 and Q2 are operably connected across resistor 12, the output of transistor Q3 is proportional to the value of the signal level appearing across the monitor 12.

The output from the differential amplifier circuitry (from the collector of transistor Q3) is applied to a D.C. amplifier 15 comprising npn transistors Q4 and Q5 connected in the illustrated circuit configuration. More specifically, the collectors of transistors Q4 and Q5 are each connected to the positive supply voltage through resistors 27 and 28 and the collector of transistor Q5 is also connected, by feedback capacitor 29, to the base of transistor Q4. The base of transistor Q4 is additionally connected to the negative supply voltage through resistor 30 and to the collector of transistor Q3; whereas, the base of transistor Q5 is connected to the emitter of transistor Q4 and to the negative supply through resistor 31. The emitter of transistor Q5 is connected directly to the negative supply. This D.C. amplifier 15 operates in a conventional manner to amplify the input signal applied to the base of transistor Q4 and generates, at the junction of resistors 27 and 28, an output voltage level that is directly proportional to the value of the voltage signal appearing at the base of transistor Q1 in the D.C. differential amplifier 13.

The junction between resistors 27 and 28 is connected to the upper mercury electrode 32a of the mercury column coulometer 14 shown in FIG. 2; whereas the lower mercury electrode 32b is connected, via resistor 33, back to the base of transistor Q1, such that the mercury column coulometer 14 is energized with a direct current whose magnitude and polarity varies as a function of the output from the D.C. amplifier 15. Moreover, this coulometer current produces a corresponding voltage signal across resistor 12a which subtracts from the voltage level appearing at the base of transistor Q1 due to existing battery current. As a result, the respective outputs of the D.C. differential amplifier 13 and the D.C. amplifier 15 are both voltage levels indicative of any difference between existing battery and coulometer currents. In other words, the coulometer 14 is included in a current regulating feedback loop to the differential amplifier 13, such that the coulometer current is controlled to be in direct proportion to existing battery current, at a ratio fixed by the relative values of resistors 12 and 12a. It should also be noted that the inclusion of the mercury column coulometer 14 in the current regulating feedback loop causes the coulometer 14 to be energized from a high impedance source. Consequently, even though the impedance of the coulometer 14 may vary with temperature, this will not affect the current conversion accuracy and the displacement of the coulometer bubble is a function of total charge transfer (current time product) accomplished.

As mentioned previously, the mercury column coulometer 14 is effective to provide a time integration of the energizing direct current value applied thereto. Therefore, inasmuch as the mercury coulometer current is in direct proportion to the existing battery current, the mercury coulometer 14 in effect integrates battery current and thus provides an accurate indication of the state of battery charge.

More specifically, when a direct current is passed in the downwardly direction through the coulometer 14, minute particles are displaced from the upper mercury electrode 32a and are collected on the lower mercury electrode 32b, according to the well-known laws for electrolytic solutions. Consequently, the electrolytic bubble 32c would migrate or displace upwardly in the mercury coulometer by an amount proportional to the product of the magnitude and application time of the applied current. Similarly, if a current is passed in the opposite or upward direction through the coulometer 14, minute particles would be displaced from the lower mercury electrode 32b and be deposited on the upper mercury electrode 32a such that the electrolytic bubble 32c would migrate in a downwardly direction in the coulometer 14.

It will be noted in FIG. 2 that when the battery 10 is charging, the battery current produces a positive voltage signal at the base of transistor Q1 and the point between resistors 27 and 28, at the output of the D.C. amplifier circuit 15, is thus driven in a negative direction such that a proportionate current is caused to pass in an upwardly direction within the mercury column coulometer 14. Consequently, the electrolytic bubble 32c migrates in a downwardly direction, until the battery stops charging. Conversely, when the battery 10 is discharging, the point between resistors 27 and 28 becomes more positive and current now flows in a downwardly direction through the mercury coulometer 14 and the electrolytic bubble 32c migrates in an upwardly direction, until the battery stops discharging.

In order to read-out this state or level of battery charge indication provided by the coulometer 14, a suitable oscillator 16 is connected to apply its output frequency to the primary winding 34a of a suitable transformer; the secondary winding 34b of which is connected across the coulometer 14 by D.C. blocking capacitor 35. A filter capacitor 36 is connected between the lower mercury electrode 32b and ground and together with the resistor 33 forms a low impedance filter to the high frequency being generated by the oscillator 16, so that the oscillator frequency does not effect the D.C. regulator loop employed to maintain the coulometer current in direct proportion to the existing battery current. A pick-up or sense loop 37 is wound about the outer glass tubing of the mercury column coulometer 14 in such a position that the electrolytic bubble 32c will first migrate or be displaced underneath the pick-up loop 37 when the battery 10 approaches its fully charged condition.

The coulometer 14 has very low resistance in its mercury electrodes 32a and b and about 150 ohms resistance in its electrolytic bubble 32c. Thus, with the sense loop 37 wrapped tightly around the glass tubing, an A.C. output, at oscillator frequency, will be obtained at loop 37 by reason of the capacitance from the loop 37 to the mercury column when the bubble 32c is between the loop 37 and the ground reference point (the lower mercury electrode 32b). However, when the bubble 32c is displaced above the output loop 37, as illustrated in FIG. 2, no A.C. output will be obtained since the loop capacitance is to a ground point. From the above, it should also be noted that there is a transition region, i.e., when the bubble 32c is passing underneath the output loop 37, during which a variable amplitude output voltage signal is produced as a function of bubble position. As will be pointed out in more detail hereinafter, at a preselected bubble position during this transition region, the output loop 37 will supply a signal input to the sense amplifier 17 just sufficient to drive the shunt amplifier 19 to remove all charging current (except for the small trickle charge) from the battery 10 and a stable state will result with the bubble 32c remaining stationary.

The pick-up loop 37 is connected to supply its output voltage signal as input to the sense amplifier 17 comprising npn transistors Q6 and Q7 and pnp transistor Q8; the output loop 37 being connected directly to the base of transistor Q6 while the lower mercury electrode 32b is connected to the negative supply by a D.C. blocking capacitor 38. The base of transistor Q6 is supplied with bias from a circuit extending between the positive and negative supplies and including resistors 39 through 43, diode 44 and by-pass capacitor 45. The transistor Q6 is connected as an emitter follower with its collector connected to the junction of resistor 41 and diode 44 and its emitter connected to the negative supply by resistors 46 and 47. The emitter output from transistor Q6 is then connected directly to the base of the following transistor Q7, whose collector and emitter are connected respectively to the positive and negative supplies by resistors 48 and 49. Feedback capacitors 50 and 51 connect the emitter of transistor Q7 back to the collector and emitter circuits respectively for transistor Q6 for the purpose of fixing sense amplifier gain. The collector of transistor Q7 is furthermore connected to supply its output signal directly to the base of the final transistor stage Q8, whose emitter is connected to the positive supply via resistor-capacitor combination 42–45 and whose collector is connected to the negative supply via resistors 52 and 49. In actual practice, the sense amplifier circuitry 17 is preferably shielded, in order to reduce circuit noise. Moreover, the oscillator 16 is preferably provided with means for adjusting the amplitude of the oscillator output signal in order to allow one to compensate for any fabrication variations in the mercury coulometer structure.

The output of the sense amplifier 17 appears at the collector of transistor Q8 and is coupled, by capacitor 53, to the detector and filter circuitry 18. More specifically, the output signal passed by the coupling capacitor 53 is connected to a D.C. restoring diode 54 which references this output of the sense amplifier 17 to the positive supply voltage level, and to the diode 55 whose anode is connected to the positive supply by resistor 56 and which acts to detect the negative peaks of the restored signal. Each of the capacitors 57 and 57a serves to filter out the A.C. component of the sense amplifier output. As a result, the base of transistor Q9 is supplied with a D.C. voltage whose magnitude varies as a function of the state or level of battery charge, as indicated by the position of the coulometer bubble 32c.

The emitter of transistor Q9 is connected directly to the positive supply and the collector of transistor Q9 is connected to ground, via capacitor 58. The transistor stage Q9 functions as a D.C. amplifier and its D.C. collector voltage output is then applied, through diode 59 and resistor 60, to the base of transistor Q10 which, together with transistors Q11 and Q12, forms the D.C. shunt amplifier 19 shown in FIG. 1. The pnp transistors Q10, Q11 and Q12 are connected across the positive (+) and ground terminals of the satellite solar cell array 11, by resistors 61 through 65, and operate, in a manner to be described in more detail hereinafter, to control the amount of charging energy supplied by the solar cell array 11 to the battery 10. More specifically, the transistors Q10, Q11 and Q12 are interconnected by emitter-base resistors 66 and 67 to be selectively controlled to vary their conduction linearly dependent upon the magnitude of the D.C. voltage level applied to the base of transistor Q10; e.g., as the voltage level developed across resistor 68 and applied as input to the base of transistor Q10 increases, the conduction of transistors Q10, Q11 and Q12 is increased to shunt increasing amounts of energy from the output of the solar cell array. The collector to base capacitors 69 and 70 provide degenerative feedback in the shunt amplifier circuitry to minimize output noise and to suppress any tendency towards oscillation.

The D.C. voltage output from the collector of amplifying transistor stage Q9 is also coupled, through diode 71 and resistor 72, to the base of npn transistor Q13 which forms part of the trickle charge control 20 shown in FIG. 1. The emitter of transistor Q13 is connected directly to the negative supply; whereas the collector is connected by resistor 73 to a Zener diode 74 and by resistor 75 to the base of transistor Q1 in the differential amplifier 13. Normally, the transistor stage Q13 is maintained in a cut-off state by the bias developed across base resistor 76 and by-pass capacitor 77. However, when the D.C. voltage level output from the transistor Q9 increases, the base of the transistor Q13 is driven more positive and results in transistor Q13 being switched into saturation. When this occurs, the Zener reference voltage is turned on and causes a predetermined current, fixed by the value of resistance 75, to be applied into the summing node of transistor Q1 in the differential amplifier 13, corresponding to a predetermined desired trickle value of charging current to which the battery 10 should be subjected even though the coulometer 14 has indicated that it is in its fully charged condition. As previously mentioned, the acceptable value of trickle charge is a function of ambient temperature. Therefore, the resistance of element 75 preferably varies inversely with temperature and therefore element 75 might, for example, be a thermistor.

In order to fully understand the operation of the illustrated embodiment of the present invention, assume that the battery 10 is in its fully charged condition such that the electrolytic bubble 32c will be at a predetermined position underneath the pick-up or sense coil 37. Therefore, a high frequency signal of relatively large predetermined amplitude will be coupled to the coil 37 and be fed to the base of transistor Q6 in the sense amplifier 17. Consequently, a relatively large positive D.C. level will be produced at the collector of transistor Q9 effective to cause the shunt amplifier transistors Q10, Q11 and Q12 to place a maximum drain on the output of the solar cell array 11. However, trickle control transistor Q13 will also be conducting at this time and cause the predetermined trickle charge current to be applied to offset the differential amplifier 13, for reasons previously discussed.

If the battery 10 now begins to discharge, the input signal applied to the base of transistor Q1 by monitoring resistor 12 goes negative and the output of the D.C. amplifier transistor stage Q5 will become positive at the point between resistors 27 and 28. As a result, a current will now begin to flow through the coulometer 14 in a downwardly direction, such that the electrolytic bubble 32c will begin to migrate in the upwardly direction (towards a position such as that shown in FIG. 2) and the amplitude of the A.C. oscillator signal picked up by the output coil 37 will decrease as the bubble 32c moves out from under the coil 37. When this occurs, a lower amplitude signal is applied to the base of transistor Q6 in the sense amplifier 17. Therefore, the output signal from the transistor Q8 (at its collector) is decreased in amplitude and a more positive or less negative D.C. voltage level is applied to the base of the transistor Q9, so as to reduce its conduction. This results in a smaller amplitude D.C. signal being coupled to the base of the shunt amplifier transistor Q10 and therefore the conduction of one or more of the transistors Q10, Q11 and Q12 is decreased, depending upon the amount of battery discharge, to reduce the drain on the solar cell array 11 and thereby permit this array 11 to apply increased amounts of charging energy to the battery 10. It should also be noted that when the battery 10 is discharged and the D.C. output voltage from transistor Q9 is thus reduced, the trickle charge control transistor Q13 is cut-off and the offsetting trickle control signal is removed from the differential amplifier circuit 13.

With the increased charging energy now being applied from solar cell array 11, the battery 10 now begins to charge and a corresponding positive signal is coupled to the base of transistor Q1 from the monitoring resistor 12. Consequently, the junction between resistors 27 and 28, at the output of transistor Q5, now goes negative and causes the coulometer 14 to be energized with a proportionate upwardly directed current. The electrolytic bubble 32c then begins to migrate downwardly and, as it moves under the pick-up coil 37, more and more A.C. output signal will be detected by the sense amplifier circuitry 17. When this occurs, the shunt amplifier linearly increases current drain to reduce the input charging energy.

From the foregoing discussion it will be seen that the feedback control loop comprising the sense amplifier 17 and the D.C. shunt amplifier 19 operates automatically and controls the output of the solar cell array 11 in such a manner that the battery 10 is charged, after a discharge is detected by the coulometer 14, until the battery 10 is returned to its fully charged condition. Moreover, as soon as the battery 10 is returned to full charge, as also detected by the coulometer 14, the trickle charge control circuitry 20 including the transistor Q13 is automatically rendered effective to apply a predetermined offsetting control signal to the differential amplifier circuitry 13 such that a proper value trickle charge current is furnished to the battery 10, even though it is in its fully charged condition.

As previously discussed, it has been observed that the safe or acceptable value of trickle charge current that may be applied to the type of batteries commonly used aboard satellites without adverse effects is often a function of ambient temperature. For example, it is desirable to reduce the trickle charge applied to the commonly used nickel-cadmium battery as the ambient temperature decreases. Therefore, suitable provisions have been made in accordance with the present invention (variable resistance element 75) for automatically adjusting the amount of trickle charge applied to a fully charged battery dependent upon the existing ambient temperature.

Obviously, many modifications and variations of the present invention are possible in light of the above teachings. It is therefore to be understood at this time that within the scope of the appended claims, the invention may be practiced otherwise than as specifically described.

We claim:
1. In a system for controlling the charging of a battery from an electrical power source, the combination of:
a coulometer effective to provide a time integration of current applied thereto,
a current regulating feedback loop circuit operably connected to said coulometer and said battery and responsive to said coulometer current and the charge and discharge current of said battery for causing said coulometer to be energized with a current proportional to existing battery charge and discharge current, whereby said coulometer provides an indication of the state of battery charge, and a second feedback loop circuit operably connected to said coulometer and said electrical power source for controlling the amount of charging energy applied by said electrical power source to said battery in accordance with the state of battery charge indication provided by said coulometer.
2. In a system for controlling the charging of a battery from an electrical power source, the combination of:
a coulometer means responsive to the charging and discharging current of said battery for integrating a proportionate current with respect to time to provide a measurement of the state of charge of said battery,
regulating circuit means including a signal comparing circuit adapted to receive first and second input signals proportional respectively to said battery and coulometer currents and to produce an output control signal to said coulometer indicative of any difference between said first and second input signals,
control means responsive to the measurement provided by said coulometer means for controlling the amount of charging current applied by said electrical power source to said battery, said control means being adapted to cause said battery to charge at a maximum available current rate when said battery is below its fully charged state and to progressively reduce said charging current as said battery approaches its fully charged state, and
trickle charge control circuitry operably connected to apply a third input signal to said signal comparing circuit when said battery is in its fully charged condition, said third input signal being effective to offset said comparing circut so that a predetermined trickle current will be applied to said battery even though said battery is in its fully charged condition.
3. In a system for controlling the charging of a battery from an electrical power source, the combination of:
a coulometer effective to provide a time integration of current applied thereto,
a current regulating feedback loop circuit operably connected to said coulometer and said battery for causing said coulometer to be energized with a current proportional to existing battery current, whereby said coulometer provides an indication of the state of battery charge, said coulometer being connected in series with said current regulating feedback loop circuit and said current regulating feedback loop circuit operates as a relatively high impedance energizing source for said coulometer, whereby the effect of any impedance variation of said coulometer is minimized, and
a second feedback loop circuit operably connected to said coulometer and said electrical power source for controlling the amount of charging energy applied by said electrical power source to said battery in accordance wtih the state of battery charge indication provided by said coulometer.
4. The combination specified in claim 1 wherein said coulometer is a mercury column coulometer.
5. The combination specified in claim 1 wherein said current regulating feedback loop circuit includes:
a signal comparing circuit adapted to receive first and second input signals proportional respectively to said battery and coulometer currents and to produce an output control signal to said coulometer indicative of any difference between said first and second input signals.
6. The combination specified in claim 5 and further including:
trickle charge control circuitry operably connected to apply a third input signal to said signal comparing circuit when said battery is in its fully charged condition, said third input signal being effective to offset said comparing circuit so that a predetermined trickle current will be applied to said battery even though said battery is in its fully charged condition.
7. The combination specified in claim 1 and further including trickle charge control circuitry responsive to the state of charge indication provided by said coulometer effective to reduce the battery charging current to a predetermined trickle value when said coulometer senses that said battery is in its fully charged condition.
8. The combination specified in claim 7 wherein said trickle charge control circuitry includes means for adjusting the value of said battery trickle current as a function of ambient temperature.

References Cited

UNITED STATES PATENTS

| | | | |
|---|---|---|---|
| 3,302,091 | 1/1967 | Henderson | 320—48 |
| 3,321,690 | 5/1967 | McCarthy et al. | 320—40 X |
| 3,255,413 | 6/1966 | Marwell et al. | 324—94 |
| 3,329,882 | 7/1967 | Sobel | 320—39 |
| 3,343,083 | 9/1967 | Beusman | 324—94 |
| 3,350,618 | 10/1967 | Barney et al. | 320—35 X |
| 3,356,922 | 12/1967 | Johnston | 320—40 X |
| 3,258,670 | 6/1966 | Piechon | 320—6 |

JOHN F. COUCH, *Primary Examiner.*

STANLEY WEINBERG, *Assistant Examiner.*

U.S. Cl. X.R.

320—23; 324—94